United States Patent [19]

Ray

[11] Patent Number: 4,705,075
[45] Date of Patent: Nov. 10, 1987

[54] ROTARY THREE-WAY PLUG VALVE

[76] Inventor: Thomas E. Ray, 13191 Lakewood Dr. NE., Aurora, Oreg. 97002

[21] Appl. No.: 819,833

[22] Filed: Jan. 17, 1986

[51] Int. Cl.⁴ ............................................ F16K 11/085
[52] U.S. Cl. ........................... 137/625.47; 137/625.24; 251/900
[58] Field of Search ...................... 137/625.47, 625.24, 137/625.22, 625.32, 876; 251/310, 314, 900, 317

[56] References Cited

U.S. PATENT DOCUMENTS

| Re. 30,224 | 3/1980 | Ortega | 137/876 X |
| 2,319,347 | 5/1943 | Reed | 137/625.24 |
| 3,405,601 | 10/1968 | Clarke | 137/625.24 X |
| 4,328,833 | 5/1982 | Aurther | 137/625.47 |

FOREIGN PATENT DOCUMENTS 378119  7/1964  Switzerland .................... 251/310

Primary Examiner—Robert G. Nilson
Attorney, Agent, or Firm—James D. Givnan, Jr.

[57] ABSTRACT

A three-way valve housing is shown with side wall and end wall defined ports. A cylindrical plug member has oblong O-ring seals which jointly extend about a major portion of the plug members circumference. A central chamber in the plug member receives fluid through a laterally directed opening which is rotatable through less than 180 degrees into communication with a housing side wall port. The plug member chamber is in open communication with the port in the valve housing end wall. A snap ring is removable to permit extraction of the plug member from the housing for servicing purposes.

6 Claims, 6 Drawing Figures

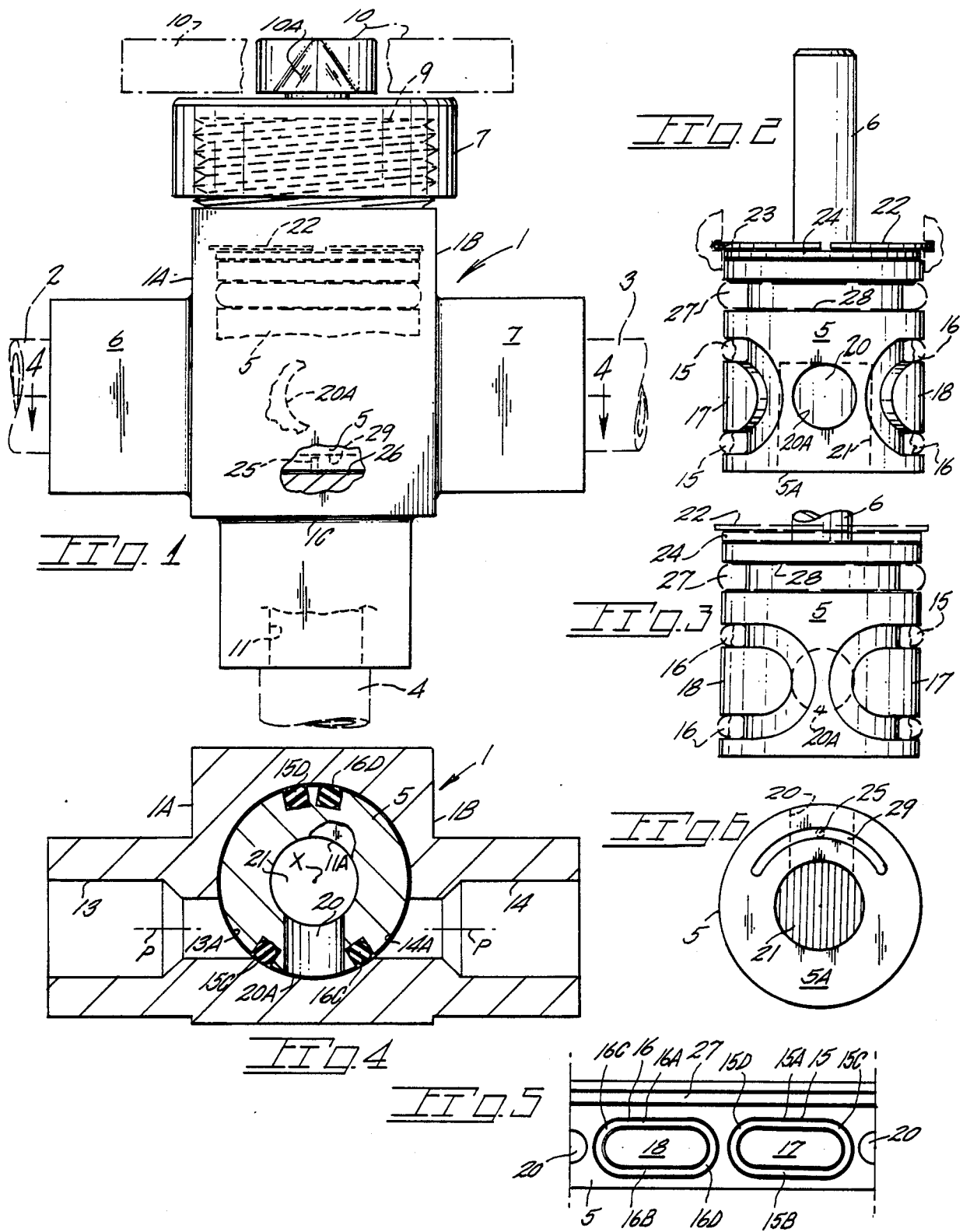

4,705,075

ROTARY THREE-WAY PLUG VALVE

BACKGROUND OF THE INVENTION

The present invention pertains generally to fluid controlling valves of the plug type having multiple seals in place on the rotary plug member.

In the prior art, several valve embodiments utilize continuous seals such as O-rings to prevent fluid passage between a plug member wall and adjacent wall of a valve housing. Examples of such prior art valves are found in U.S. Pat. Nos. 3,133,723; 3,168,280; 3,360,236; 3,991,975; and 4,031,918. For the most part the foregoing valve examples are two-way valves with the plug member having open and closed positions with a transverse opening communicating ports on opposite sides of a valve housing. The O-ring seals of such valves may be of elongate, rectangular or oval configuration as determined by the size and shape of the valve housing port being sealed. Further, such O-ring seals are symmetrically disposed on the plug member. The last mentioned above patent utilizes O-rings in place on a plug member that has the capability of simultaneously communicating two pairs of valve ports with the O-rings and plug member defining arcuate passageways between ports.

SUMMARY OF THE PRESENT INVENTION

The present invention is embodied within a valve having a plug member equipped with O-rings and defining a port in communication with an interior chamber of the plug member which is in open communication with a centrally disposed port.

The present valve utilizes an O-ring equipped rotary plug member having a radially directed fluid passage for rotation into commication with a housing defined port. A remaining port in the housing is sealed against fluid entry by an O-ring. In either of the fully open positions of the valve the plug member passage is in direct communication with a valve housing port while the remaining or closed port of the valve housing sealed off from fluid entry by a plug mounted O-ring. In one valve embodiment, aligned housing ports are in a common plane which is offset from the rotational axis of the plug member. The plug member is in endwise communication with a centrally disposed housing port.

Important provisions of the present valve include the provision of a three-way valve which may be readily refurbished without being uncoupled from its inlet and outlet conduits; the provision of a three-way valve which dispenses with packing and attendant problems; the provision of a three-way valve using O-ring type seals which valve includes an off position blocking all fluid flow; the provision of a three-way plug valve which includes an off position.

BRIEF DESCRIPTION OF THE DRAWINGS

In the accompanying drawings:

FIG. 1 is a front elevational view of the present valve;

FIG. 2 is an elevational view of the plug member removed from the present valve;

FIG. 3 is an elevational view of the plug member shown in FIG. 2 rotated through 180 degrees;

FIG. 4 is a horizontal sectional view taken downwardly along line 4—4 of FIG. 1;

FIG. 5 is a schematic view of the plug member exterior when projected on to a plane; and FIG. 6 is a bottom view of the plug member of FIG. 2.

DETAILED DESCRIPTION OF THE PREFERRED EMBODIMENTS

With continuing reference to the accompanying drawings wherein applied reference numerals indicate parts similarly hereinafter identified, the reference numeral 1 indicates generally a valve housing of the present valve suitably coupled to fluid conduits 2, 3 and 4. Housing side walls are at 1A and 1B while a bottom wall is at 1C.

Disposed within the housing is, as best shown in FIGS. 2 and 3, a plug member 5 of generally cylindrical shape and later described in detail. A stem 6 is integral with the cylinder portion of the plug member and extends through a closure or cap 7 removably attached to the valve housing as by external threads on a housing boss 9 and mating threads on the cap interior. A stem mounted handle is at 10 which has a pointed end 10A for indicating plug member position.

As best viewed in FIG. 4, valve housing side bosses at 6 and 7 are formed with bores at 13 and 14 which receive fluid flows from conduits 2 and 3. Ports 13A–14A at the innermost ends of 13A and 14A are in a common plane P which is offset from the rotational axis X of the plug member. A bottom wall bore is at 11 and terminates inwardly at a port 11A.

Plug member 5 is equipped with O-rings 15 and 16 and, as viewed in FIG. 5, each is of elongate, racetrack shape with parallel side segments 15A–15B; 16A–16B; and curved end segments 15C–15D; 16C–16D. Each O-ring circumscribes an uninterrupted oblong surface area 17 and 18 on the plug exterior. A passage 20 has an opening at 20A on the plug member exterior and is rotatable during valve use into communication with either side wall defined port. Upon such positioning a fluid flow is through plug passage 20 and into an internal, downwardly opening chamber 21 of the plug. The elongate O-rings function in an alternate manner to form a seal about the remaining or unused port in the housing side wall. Similarly, when the plug member is repositioned to locate opening 20A in communication with the other wall defined port of the housing, the remaining O-ring is positioned to block any reverse flow out of the unused port. Plug chamber 21 is concentric with the axis of the plug member.

The plug member is shown rotatably confined within the housing by a snap ring 22 which seats in an annular groove 23 and overlies and confines a centrally apertured disc 24. Removal of the ring and disc, subsequent to cap removal, permits convenient upward extraction of the plug member.

A pin 25 protruding from the bottom interior wall 26 of the housing is received within an arcuate recess 29 (FIG. 6) of the plug member bottom wall 5A with contact with the pin with the recess ends determining the extent of plug member rotation to assure registration of plug member opening 20A with valve port 13A or 14A.

For the prevention of leakage along the plug body, an O-ring 27 is provided confined within an annular groove 28 extending about the plug member.

The present valve assembly may be used in the manner of a three-way valve communicating either conduit 2 or 3 with port 11A in the valve housing end wall. Additionally, plug member passage 20 may be located in partial registration with a valve housing port to permit a regulated or partial flow through the valve. The present valve has an "OFF" position wherein plug opening 20A is positioned equidistant or medically between housing ports 13A and 14A. In this latter instance each O-ring serves to confine any fluid flow within a plug outer wall surface area 17-18 circumscribed by each O-ring.

While I have shown but one embodiment of the invention, it will be apparent to those skilled in the art that the invention may be embodied still otherwise without departing from the spirit and scope of the invention.

Having thus described the invention, what is desired to be secured in a Letters Patent is:

I claim:

1. A three-way valve having a closed position and comprising in combination,
   a valve housing having side wall structures defining side wall ports and an end wall defining an end wall port,
   a rotatable cylindrical plug member in said housing and including multiple elongate continuous seals each extending about an uninterrupted plug outer surface area, said plug member defining a central chamber at all times in communication with said end wall defined port, a radially directed passage in said cylindrical plug member in communication with said chamber and terminating radially outwardly in a plug member opening located intermediate said seals, said opening selectively positionable into communication with one of said side wall ports, means for imparting arcuate rotation to said plug member, said plug member closing the valve when the plug member opening is positioned intermediate the side wall ports, and
   said side wall ports being in a plane offset from the rotational axis of said plug member.

2. The fluid valve claimed in claim 1 wherein said continuous seals are each of elongate configuration and each having parallel side segments and continuously curved end segments, said side segments lying in parallel planes normal to the plug member axis of rotation.

3. A three-way valve comprising in combination,
   a valve housing having side walls defining side wall ports and an end wall defining an end wall port,
   a rotatable cylindrical plug member in said housing and including multiple continuous elongate seals each extending about an uninterrupted outer wall surface area of the plug member, said plug member defining a central chamber at all times in communication with said end wall defined port, a radially directed passage in said cylindrical plug member in communication with said chamber and terminating radially outwardly in a plug member opening, said opening selectively positionable into communication with one of said side wall defined ports or out of communication with either of said side wall ports to close the valve, means for imparting arcuate rotation to said plug member, said plug member closing the valve when rotated so as to locate said plug member opening intermediate said side wall defined ports, and
   said side wall ports being in a plane offset from the rotational axis of said plug member.

4. The fluid valve claimed in claim 3 wherein said plug member opening is located on the rotatable plug member intermediate the continuous seals.

5. The fluid valve claimed in claim 3 wherein said continuous seals are each of elongate configuration and each having parallel side segments and continuously curved end segments, said side segments lying in parallel planes normal to the plug member axis of rotation.

6. A three-way valve comprising in combination,
   a valve housing defining a pair of aligned ports and an end wall defining an end wall port,
   a rotatable cylindrical plug member in said housing and including continuous seals of elongate shape each extending respectively about an uninterrupted outer wall surface area of the plug member, said plug member rotatable about an axis, means for imparting rotation to said plug member, said plug member defining a central chamber in communication with said end wall port, said plug member defining a radially directed passage in communication with said chamber and terminating radially outward in a plug member opening, said opening alternately positionable into communication with either of said aligned ports in said housing, said opening also positionable medially between said aligned ports to stop fluid flow.
   said aligned ports in said housing being in a common plane offset from the plug member axis of rotation, and
   each of said continuous seals on said plug member alternatively positionable about one of said aligned ports to close same when said plug member opening is in registration with the remaining one of said aligned ports.

* * * * *